Nov. 4, 1969    L. E. BOBBITT    3,476,242

HOSIERY MEASURING AND PAIRING APPARATUS

Filed Sept. 20, 1967    2 Sheets-Sheet 1

INVENTOR.
LEONARD E. BOBBITT

BY

ATTORNEY

United States Patent Office 3,476,242
Patented Nov. 4, 1969

3,476,242
HOSIERY MEASURING AND PAIRING APPARATUS
Leonard E. Bobbitt, P.O. Box 9122,
Greensboro, N.C. 27408
Filed Sept. 20, 1967, Ser. No. 669,041
Int. Cl. B07c 7/00; A47b 81/00
U.S. Cl. 209—122                                7 Claims

ABSTRACT OF THE DISCLOSURE

This invention relates to an apparatus for measuring and pairing women's stockings, and more particularly to an apparatus which enables an operator, after measuring the length of a stocking, to initiate a pre-cycled sequence of steps which includes the presentation and withdrawal of an appropriate receptacle for that size stocking.

BACKGROUND OF THE INVENTION

In the production of women's stockings, after the stockings are grouped as to foot sizes, an additional operation may be undertaken to match the stockings according to the leg length, so that a matched pair of stockings includes stockings which are the same length as well as the same foot size.

Initially, this operation was carried out manually by visually comparing stockings of the same foot size until matched pairs were accumulated. This process was slow and tedious and very wasteful of the operator's time. Another manual method comprised measuring the length of each stocking and then placing the measured stocking in a designated storage bin or rack.

An improvement upon the above methods is shown in the apparatus of the Hartshorn Patent No. 3,022,892 issued Feb. 27, 1962. Hartshorn shows a hosiery pairing apparatus, wherein the stockings are laid out with one end of the stockings terminating along a work surface parallel to a series of pressbutton switches, each switch corresponding to a different length of stocking. Each switch is electrically connected to an indicator lamp on one of the support arms of an adjacent storage rack, there being a support arm for each length of stocking being measured. The apparatus is operated by placing one end of a stocking at a guide point with the other end terminating adjacent one of the switches. The operator presses the switch adjacent the end of the stocking, and a signal light is illuminated on the arm of the storage rack designated to receive stockings of that particular length.

It is readily apparent that although the apparatus disclosed by the Hartshorn patent is an improvement upon the manual methods described earlier in this specification, it is not entirely satisfactory, because the operator is still required to observe and select the designated support arm of the storage rack. The apparatus of Hartshorn merely acts as an aid to draw the operator's attention to the appropriate support arm. Moreover, the support arms in Hartshorn are static and therefore grouped around the operator at different locations which necessitates tiresome and time-consuming movements by the operator to place the stockings on the appropriate support arms. Despite the visual signal provided by Hartshorn, there is still an opportunity for human error by the operator in moving the stocking to the appropriate support arm.

SUMMARY OF THE INVENTION

According to the present invention, the improved apparatus comprises a work or measuring surface and an adjacent housing or support containing a series of vertically spaced drawers or storage trays. The measuring surface further includes a guide line adjacent one side of the housing and an indicator plate comprising a row of electrical switches adjacent the other side of the housing arranged at successively greater distances from the guide line. Actuation of any switch in the row causes a corresponding drawer to be automatically urged outwardly from the housing to a position above the work surface in front of the operator. It is not necessary for the operator to select a designated support arm or other location to deposit the stocking, because the appropriate drawer or tray is the only one presented for reception of the stocking. After actuating the switch corresponding to the length of the stocking, the operator is freed from further mental effort and need only deposit the stocking in the drawer presented. The drawer actuating mechanism is suitably cycled for retraction of the drawer into the cabinet without further attention by the operator after a predetermined time interval during which the stocking is deposited in the drawer.

A counting mechanism is operatively associated with each tray or drawer, so that when that drawer has received a predetermined quantity of stockings, a signal light is automatically actuated upon the work surface to indicate to the operator that the drawer has received its complement of stockings and should be emptied.

It is an object of this invention to provide an apparatus for measuring and pairing stockings requiring a minimum amount of attention on the part of the operator.

It is a further object of this invention to provide an apparatus for measuring and pairing stockings whereby the pairing operation can be speeded up, and the chances of mistakes essentially eliminated.

It is a further and more specific object of this invention to provide a measuring and pairing apparatus including a series of reciprocal drawers, one drawer for each length of stocking to be measured, and means for selectively opening a designated drawer for reception of a stocking and subsequently closing the drawer with a minimum amount of attention necessary on the part of the operator.

Further objects and advantages of the invention will become apparent from the following description and claims, and from the accompanying drawings, wherein:

Figure 1:
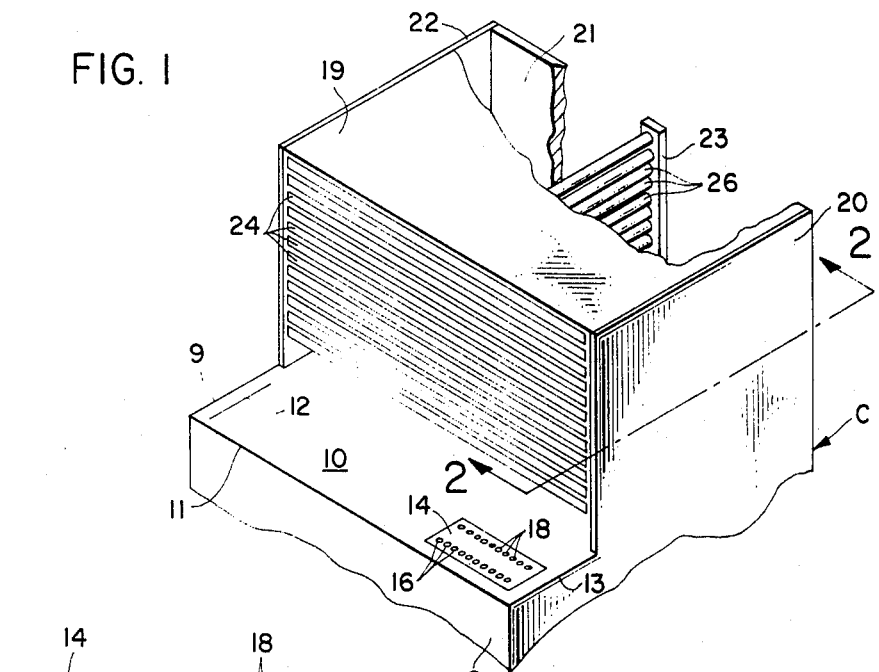
FIGURE 1 is a perspective view with parts broken away of an improved hosiery measuring and pairing apparatus constructed in accordance with the present invention.
Figure 3:
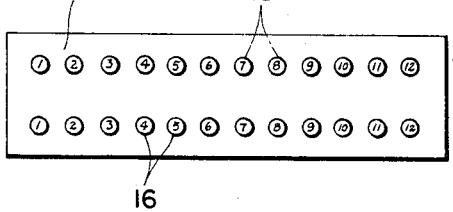
FIGURE 3 is an enlarged plan view of the indicator plate.

Referring now more particularly to the drawings, in FIGURE 1 the hosiery pairing and measuring cabinet C comprises a suitable base or frame portion 8 which supports a horizontally disposed, measuring surface or table 10. A base or reference line 12 is provided on the table 10 adjacent one end edge 9, and spaced along one longitudinal edge 11 of measuring table 10, nearest the operator, from the base line 12 is an indicator plate 14 secured to table 10 at a point spaced inwardly from longitudinal edge 11 and adjacent end edge 13 of measuring table 10.

Indicator plate 14 is spaced a suitable distance from reference line 12, so that when the leg of a stocking is positioned with the heel on reference line 12, the welt end of the attenuated stocking will normally terminate between the ends of indicator plate 14.

Indicator plate 14 includes a row of electric push-button switches 16 extending parallel to the direction in which the stockings extend when they are attenuated between the reference line 12 and plate 14. The electric switches 16 are spaced from each other a desired distance, such as one-half inch, so that the switches spaced successively further from the reference line 12 provide a measurement of stocking lengths in one-half inch increments, or such other increments of measurement as may be desired.

The cabinet C also includes end walls 20 and 22 extending upwardly from the rear portion of the measuring table 10, and top wall 19 and rear cover 21 extend between the upper and rear edges of end walls 20 and 22 to define a housing therebetween, opening only at the front toward the operator. A series of vertically spaced, horizontally extending drawers or trays 24 extends between end walls 20 and 22 and are supported thereby for reciprocation between a closed or storage position within the housing to an open or second position above or in close proximity to the measuring surface of work table 10 in front of the operator. It should be noted that although an enclosed housing is illustrated and described hereinabove, the housing need not be enclosed, as an open framework or support would suffice to mount the trays. Moreover the drawing illustrates that the trays are removed from the storage position to a second position above the work surface. The second position, is not to be limited to the space immediately above the work surface, as any position nearer to the operator than the remainder of the trays would be sufficient.

Figure 2:
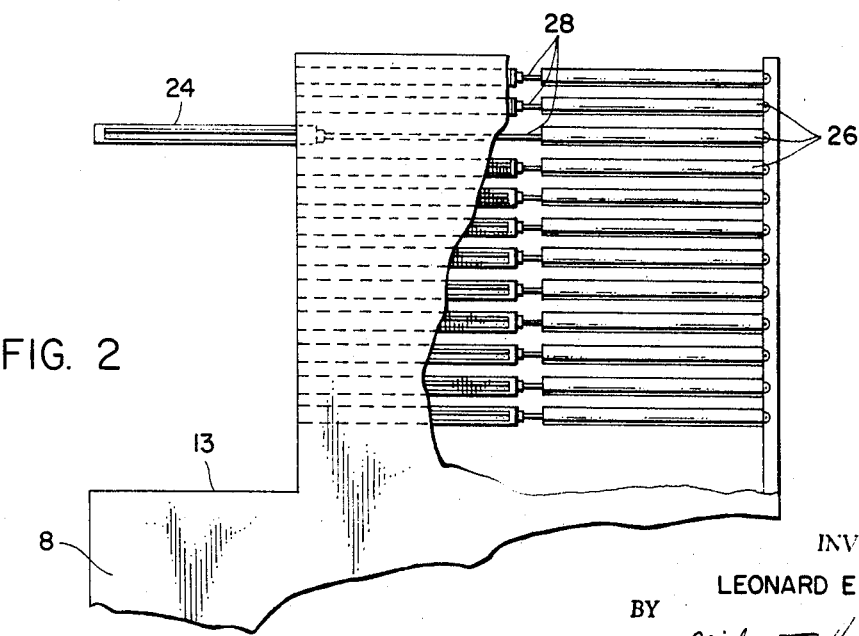
FIGURE 2 is a side elevation with parts broken away taken substantially along line 2—2 in FIGURE 1, showing one of the drawers in its open position.
Figure 4:
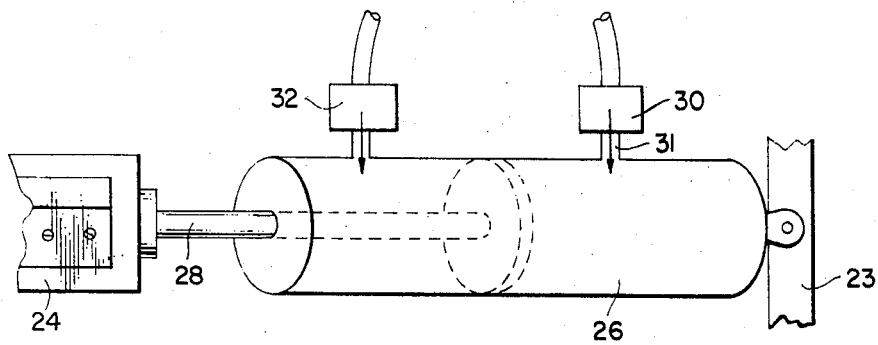
FIGURE 4 is an enlarged perspective view, partially in section, and with parts broken away, of one of the air cylinders according to the invention.

Reciprocation of the drawers 24 may be accomplished by a series of vertically spaced, double acting air cylinders 26, shown in FIGURE 4, attached at corresponding ends to a vertically extending support member 23, which in turn is secured to the rear cover 21 of the cabinet C. Each of air cylinders 26 has an associated piston 28 attached to the rear of one of the drawers 24, so that when one of air cylinders 26 is actuated through manipulation of an appropriate switch 16, its associated piston 28 will urge the drawer forward to its open position (see FIGURE 2). Although the apparatus is shown with only one air cylinder per drawer attached to the central portion of the drawer, it is to be recognized that there could alternatively be provided a pair of air cylinders for activating each drawer.

As stated above, air cylinders 26 are double acting, so that after the drawer is in its open position for a predetermined period of time, the piston 28 is moved back into its cylinder, withdrawing the drawer back to its normally closed position within the cabinet. Also, the length of the piston stroke is such that at its fully extended position, drawer 24 is at its open position.

Figure 5:
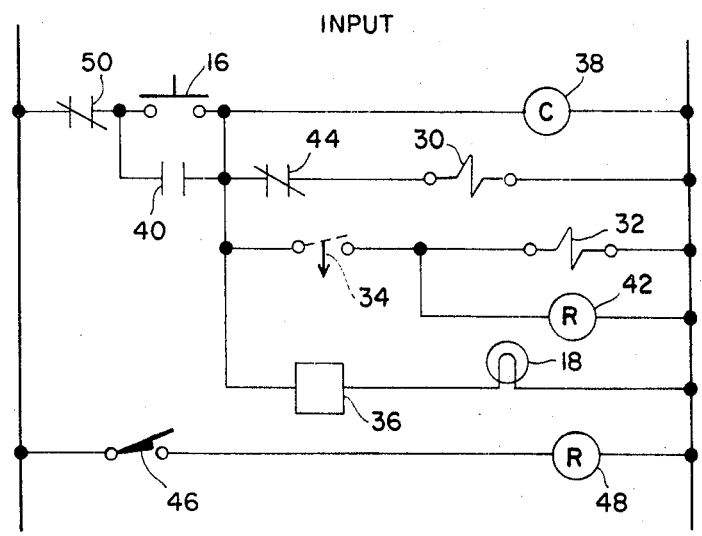
FIGURE 5 is a schematic view of the electrical circuit.

FIGURE 5 illustrates one example of an electrical circuit which is adaptable to operate the apparatus described above, however, it is to be recognized that there are other electrical or mechanical arrangements that would satisfactorily operate the apparatus within the spirit and scope of this invention.

The depression of switch 16 actuates a holding coil 38 closing normally open contact 40, to supply current to the circuit. The resulting current energizes a solenoid 30 which in turn is adapted to activate one of air cylinders 26, thus urging one of drawers 24 to an open position. The current resulting from a closing of switch 16 also operates a timer 34, which, at the end of a predescribed period of time, actuates relay 42 opening normally closed contacts 44 to deenergize solenoid 30. Timer 34 also energizes a second solenoid 32 to reverse the flow of air in air cylinder 26 and withdraw drawer 24. As drawer 24 returns to its original position, it depresses limit switch 46 which actuates a second relay 48 having normally closed contacts 50. The resulting opening of contacts 50 breaks the drawer circuit originally closed by holding coil 38 and returns the circuit to its original state, ready to be actuated again by the depression of switch 16.

A row of indicator lamps 18 extends parallel to said first row of electric switches 16 and each indicator lamp 18 is electrically connected to the same one of drawers 24 which is operated by the adjacent switch 16. An electrical counter 36, shown in FIGURE 5, is operably connected into each lamp and drawer circuit and counts the number of times the associated drawer is opened. When the drawer 24 has been opened a prescribed number of times, counter 36 activates the corresponding signal lamp 18 to indicate that the drawer should be emptied.

The apparatus is operated in the following manner: The operator picks up a stocking, places the heel of the stocking at guide point 12 and extends the stocking to its full length, with the other end of the stocking leg terminating adjacent one of switches 16 on indicator plate 14. Whereupon, the operator engages said switch 16 activating the corresponding solenoid 30, as described above, to operate the designated drawer and advance it to an open position. The cycle timer 34 is pre-set for a limited period of time, for example three seconds, and at the end of this period, energizes the second solenoid 32 to close the drawer.

There is thus provided a hosiery pairing and measuring apparatus which eliminates the necessity for the operator to locate the proper disposal point for the stocking after the measurement has been made.

Any other form of drawers or trays for the stockings may be used, however, so long as it incorporates a means for presenting such drawer or tray to the operator, eliminating the necessity for him to select and dispose of the stocking at the proper location after measurement. Also, although the control system described is electrically operated, it is within the scope of the invention to provide other appropriate control systems, such as a pneumatic system.

While a specific embodiment of an improved hosiery measuring and pairing apparatus has been disclosed in the foregoing description, it will be understood that various modifications within the spirit of the invention may occur to those skilled in the art.

I claim:
1. A hosiery measuring and pairing apparatus comprising:
  (a) a measuring table having a measuring surface, means on said surface for measuring the lengths of successive stockings, a series of switches associated with said measuring means, each of said switches corresponding to a prescribed stocking length;
  (b) a series of storage trays spaced from said measuring means in a storage position, said trays being slidably mounted for reciprocal movement between said storage position and a second position adjacent said measuring means, each of said trays being operatively connected to one of said switches;
  (c) means operatively connecting said switches and trays, said means being responsive to said switches for selectively moving said trays to said second position for receiving a stocking, whereby when a stocking is measured, the switch corresponding to said stocking length is actuated to move the corresponding tray.

2. A hosiery measuring and pairing apparatus according to claim 1 wherein said means for moving said tray to said second position further includes a means for returning said tray to said storage position after the stocking is received on the tray.

3. The apparatus according to claim 1 wherein the means for measuring the length of a stocking includes a reference line at one end of said measuring surface, said switches being arranged in a row on said measuring surface and spaced from said reference line to measure different lengths of stockings, said switches being spaced apart successively greater distances from said reference line.

4. The apparatus according to claim 2 wherein the means for moving said trays to said second position and returning said trays to said storage position comprises a double acting air cylinder.

5. The apparatus according to claim 1 wherein there is further provided a means for counting the number of times each storage tray moves to said second position and returns to said storage position and indicating when each tray has been moved a prescribed number of times.

6. The apparatus according to claim 5 wherein the means for counting and indicating the number of movements of each tray comprises a series of indicating lights, each indicating light positioned adjacent a corresponding switch and electrically connected to a counting means operatively connected to one of said trays corresponding to said switch, so that when the corresponding tray has been moved to said second position a prescribed number of times, the indicating light is illuminated beside the switch corresponding to said tray.

7. The apparatus according to claim 2 wherein means are provided for controlling the length of time the trays remain in said second position.

References Cited

UNITED STATES PATENTS

| | | | |
|---|---|---|---|
| 2,920,765 | 1/1960 | Royer | 209—122 X |
| 3,005,672 | 10/1961 | Becker | 312—223 |
| 3,022,892 | 2/1962 | Hartshorn | 209—122 |

ALLEN N. KNOWLES, Primary Examiner

U.S. Cl. X.R.

312—223